Patented Apr. 20, 1954

2,675,881

UNITED STATES PATENT OFFICE 2,675,881

TREATING PERMEABLE EARTH FORMATIONS

Paul H. Cardwell, Tulsa, Okla., assignor to The Dow Chemical Company, Midland, Mich., a corporation of Delaware No Drawing. Application August 19, 1950, Serial No. 180,503

4 Claims. (Cl. 166—22)

1

The invention relates to the treatment of an earth formation penetrated by a well bore drilled thereinto for a fluid product such as oil, gas or water.

In my U. S. Patent No. 2,485,527 I have described a method of producing a synthetic resinous liquid and hardening the same in situ in the interstices of an earth formation whereby the interstitial space is sealed against fluid flow and consolidation of loose earth particles is effected. The method involves the preparation of two resinous liquid partial condensation products which may be stored for future use and at the time of use are mixed together and a catalyst added. The liquid mixture is then injected into the earth where the liquid hardens into a solid resin binding loose earth particles together and sealing the interstices against fluid flow. The rate at which the liquid hardens is dependent upon the temperature of the earth and the amount of catalyst used. One of the two liquid partial condensation products thus used is obtained by the partial condensation of an aldehyde and an alkylated phenol; the other by partially condensing an aldehyde, a phenol and either phloroglucinol or resorcinol. Certain disadvantages inure to the foregoing procedure.

In addition to requiring two liquid partial condensation products for the practice of the method, there is the disadvantage that the liquid mixture injected into the earth through a well bore tends to drain away readily into the more permeable portions reached by the well bore while failing to penetrate adequately the less permeable portions of the earth adjacent to the more permeable portions. As a consequence the less permeable portions of the earth may not receive enough of the liquid mixture to effect complete earth consolidation and pore sealing. Inasmuch as the use, in this manner, of the liquid partial condensation products of aldehyde and phenolics is generally desirable due to the ease of manipulation, certainty and controllability of hardening in situ, and the permanence of the resulting solid resin, it is a desideratum in the art to overcome the difficulty of avoiding excessive penetration of the liquid mixture when the earth formation to be treated comprises excessively permeable portions. Accordingly, I have developed an improved method of earth consolidation and sealing the interstices of earth formations which overcomes aforementioned difficulties.

In the present improved method I prepare a liquid partial condensation product of phenol

2 and aldehyde, which in the initial stages of preparation is similar in all respects to that of the "second liquid" of the aforesaid patent. That is, I react together phenol and aldehyde (formaldehyde or paraformaldehyde) in the presence of an alkali catalyst in aqueous solution until the mixture increases in viscosity substantially, neutralize with HCl, and then separate the resulting upper aqueous non-resinous layer from the lower resinous layer. At this point the procedure of the present invention departs from the patent. Although I now add a polyhydroxybenzene (resorcinol or phloroglucinol) to the resinous lower layer, I use a much smaller proportion. The resulting resinous liquid constitutes the stock of resinous liquid which may be stored for future use. At the time a treatment of an earth formation is to be made paraformaldehyde is added and also if necessary to secure fast setting of the resin an alkali catalyst. The resulting mixture is injected into the earth formation.

The effect of adding the paraformaldehyde to the polyhydroxybenzene-treated partial condensation product of the aldehyde and phenol is to form within the product a gel-like resin or semi-solid resin which acts as a filler or thickener. The filler or thickener thus formed is more or less strained out of the liquid wherever it drains into the interstices of the fluid permeable earth and hinders or prevents excessive penetration or loss of the liquid partial condensation product into the more permeable portions of the earth formation. In time both the filler or thickener and the liquid partial condensation product harden in situ into a single homogeneous solid resin without voids, binding loose earth particles together and sealing the interstices against fluid flow.

The invention then consists of the method hereinafter more fully described and particularly pointed out in the claims.

In carrying out the invention a quantity of the liquid partial condensation product of aldehyde and phenol is prepared by cooking together phenol and aldehyde in the proportions of about 0.71 to 2.1 moles of the aldehyde per mole of phenol in the presence of an alkali catalyst. The aldehyde may be either formaldehyde, such as the conventional 37% aqueous solution, or paraformaldehyde, the latter being taken as having the formula: 3(HCHO) in computing the proportions. As the catalyst there may be used an aqueous alkaline solution such as an aqueous solution of an alkali metal carbonate or hydroxide. A suitable concentration of the alkaline solution is about 25 to 50% of alkali by weight although other concentrations may be used. The alkali is used in a proportion of about 0.015 to 0.6 mole of alkali per mole of phenol. The mixture of phenol, aldehyde, alkali and water (present in the aldehyde solution and alkali solution) which may amount to as much as 20 moles of water per mole of phenol, is cooked at about 175° F. under a reflux condenser, preferably at atmospheric pressure, until the viscosity of the cooked mixture becomes 25 to 200 centipoises measured at 80° F.

The cooked mass is cooled and then treated with enough aqueous hydrochloric acid (preferably at least about 30% HCl) to slightly acidify it (pH 4 to 6). The amount of hydrochloric acid required for the acidification depends upon the amount of alkali used as the catalyst and varies from a minimum of about 0.016 mole for the lowest amount aforementioned of catalyst to 0.64 mole for the highest. The acidification of the cooked mass results in the formation of two superimposed liquid layers. The upper layer comprises salt water and is rejected. The lower layer is a liquid partially condensed phenol-aldehyde resin having a viscosity, measured at 80° F. of 100 to 2000 centipoises.

One of the polyhydroxybenzenes, resorcinol or phloroglucinol, is stirred into the partially condensed phenol-aldehyde resin, obtained as above, in the proportion of about 0.1 to 0.21 mole per mole of phenol in the resin. The resulting liquid resin is sufficiently stable to permit holding in storage for future use.

At the time an earth formation is to be treated a suitable volume of the liquid resin prepared as described and containing the polyhydroxybenzene is made ready for use by mixing with it from 0.15 to 1.0 mole of paraformaldehyde in finely divided form per mole of phenol in the liquid resin. The paraformaldehyde causes the liquid resin to harden in about five hours at 175° F. but a still shorter hardening time can be had by mixing a catalyst, viz: an alkali, with the liquid resin at the same time the paraformaldehyde is added. Suitable alkalis for the purpose are the alkali metal hydroxides and carbonates, and up to 0.015 mole of the alkali may be used per mole of phenol in the liquid resin. The alkali is added to the liquid resin as an aqueous solution which may contain from about 2.2 to 145 moles of water per mole of alkali.

The following example is illustrative of the preparation of a stock of partially condensed phenol-aldehyde liquid resin containing a polyhydroxybenzene.

390 lbs. of phenol (4.15 moles), and 506 lbs. of aqueous formaldehyde containing 37% of HCHO by weight (6.24 moles HCHO), and 50 lbs. of a 50 per cent (by weight) aqueous caustic soda solution (0.625 mole NaOH) are mixed together in a reaction vessel equipped with a reflux condenser. The mixed materials are cooked by maintaining the mixture at about 175° F. for about 2.5 hours. The cooked mass thus obtained is cooled to room temperature. It weighs 937.8 lbs., has a volume of 96.2 gallons and a viscosity of 47 centipoises measured at 80° F. The cooled mass is acidified with 7.8 gallons of 32% hydrochloric acid (0.66 mole of HCl) whereupon the mass separates into two liquid layers. The top layer consists of about 36.1 gallons (334.2 lbs.) of aqueous salt solution which is separated from the lower layer and rejected. The bottom layer is a liquid resin weighing 679.3 lbs. Its volume is 67.9 gallons and viscosity measured at 80° F. is 230 centipoises. To this liquid resin is added 69.1 lbs. of resorcinol (0.62 mole) with stirring until dissolved. The resulting resinous liquid has a volume of 74.4 gallons, weighs 748.4 lbs., and its viscosity is 210 centipoises measured at 80° F. This resinous liquid is relatively stable and may be stored for future use. At the time an earth formation is to be treated there is added to the foregoing resinous liquid 63.2 lbs. (2.1 moles) of finely divided paraformaldehyde. There results 811.6 lbs. (79.7 gallons) of resinous liquid for use in the treatment of an earth formation. The resinous liquid, which has a viscosity at 80° F. of 300 centipoises when freshly made, spontaneously hardens to an oil- and water-insoluble solid resin in about 5 hours at 175° F.

In treating an earth formation penetrated by a well bore, it is necessary to inject the resinous liquid into the earth formation soon after the last step in the preparation of the resinous liquid, i. e. after adding the paraformaldehyde, or both the paraformaldehyde and alkali catalyst if one is used, but not before the formation within the liquid resin of the gelled resin which results from the interaction of the paraformaldehyde and polyhydroxybenzene. Sufficient gelation is had within about 10 to 30 minutes after the paraformaldehyde is added to provide the filler or thickener which prevents excessive loss of the resinous liquid into the more permeable portions of the earth formation.

As to the rate at which the injected resinous liquid hardens, this depends upon the temperature of the earth formation in part and may be increased for a given earth temperature by the inclusion of an alkali catalyst in the resinous liquid at the time of the addition of the paraformaldehyde as aforementioned. The following table sets forth illustrative examples of the amount of alkali catalyst and the corresponding setting times for the batch of paraformaldehyde-containing resinous liquid (811.6 lbs.) of the foregoing example.

Table

[Setting time in hours at 175° F. of batch (811.6 lbs.) of paraformaldehyde-containing liquid resin of example mixed with various amounts of alkali catalyst in 50% aqueous solution.]

| Catalyst | | | | Setting time, hours |
|---|---|---|---|---|
| Alkali | Lbs. of alkali | Volume of alkali solution quarts | Moles of alkali per mole of phenol in batch | |
| None | None | None | None | 5.0 |
| $K_2CO_3$ | 0.6428 | 0.4 | 0.00112 | 4.5 |
| $K_2CO_3$ | 1.2856 | 0.8 | 0.00224 | 4.0 |
| $K_2CO_3$ | 1.9284 | 1.2 | 0.00336 | 3.5 |
| $K_2CO_3$ | 2.5712 | 1.6 | 0.00448 | 3.0 |
| NaOH | 0.6365 | 0.4 | 0.00384 | 2.5 |
| NaOH | 1.2730 | 0.8 | 0.00768 | 2.0 |
| NaOH | 1.9095 | 1.2 | 0.01152 | 1.0 |

The foregoing examples are illustrative rather than strictly limitative as other proportions of catalyst may be used and setting or hardening of the paraformaldehyde-containing liquid resin can be effected at other temperatures. At lower temperatures hardening of the resin takes a longer time while at higher temperatures setting is more rapid.

In forming a sealing deposit of the resin in a deep well bore or in the earth penetrated by the well bore the liquid resin, prepared as above described, and containing a catalyzing amount of alkali if necessary to speed setting, is introduced into the well and thence into the earth formation in any convenient manner known in the art. For example, a dump bailer may be used or the liquid resin may be introduced through the usual tubing string or through the usual casing or other conduit in the well bore.

Among the advantages of the method are that excessive loss of liquid resin into the more permeable portions of the earth formation are prevented before the liquid resin hardens sufficiently to become immobile.

I claim:

1. In a method of forming a sealing deposit in fluid permeable earth penetrated by a well bore, the steps which comprise cooking a mixture of phenol and an aldehyde of the group consisting of formaldehyde and paraformaldehyde in the presence of a catalyst consisting of an aqueous solution of an alkali selected from the group consisting of the alkali metal hydroxides and carbonates, the proportion of aldehyde being from about 0.71 to 2.1 moles per mole of phenol, until the viscosity measured at 80° F. is about 25 to 200 centipoises, acidifying the cooked mixture with hydrochloric acid, whereby the pH of the mixture is reduced to between 4 and 6, and the mixture separates into two superimposed liquid layers the upper layer comprising salt water the lower comprising a liquid partially condensed phenol-aldehyde resin, separating the said lower liquid layer from the said upper liquid layer, mixing with the separated lower liquid layer a polyhydroxybenzene selected from the group consisting of phloroglucinol and resorcinol in the proportion of about 0.1 to 0.21 mole of the polyhydroxybenzene per mole of phenol in the lower liquid layer, mixing with the resulting polyhydroxybenzene-containing liquid resin about 0.15 to 1.0 mole of paraformaldehyde per mole of phenol therein, and within 10 to 30 minutes thereafter introducing the resulting mixture into the well bore and thence into the earth formation and allowing the mixture to harden in situ.

2. In a method according to claim 1 the inclusion in the polyhydroxybenzene-containing liquid resin of an alkaline catalyst selected from the group consisting of the alkali metal hydroxides and carbonates.

3. In a method according to claim 1 in which the polyhydroxybenzene is resorcinol.

4. In a method according to claim 2 in which the polyhydroxybenzene is resorcinol.

References Cited in the file of this patent

UNITED STATES PATENTS

| Number | Name | Date |
| --- | --- | --- |
| 1,802,390 | Novotny | Apr. 28, 1931 |
| 1,851,021 | Schuette | Mar. 29, 1932 |
| 2,235,193 | Balz | Mar. 18, 1941 |
| 2,437,710 | Rhodes | Mar. 16, 1948 |
| 2,485,527 | Cardwell | Oct. 18, 1949 |
| 2,489,336 | Spahr | Nov. 29, 1949 |
| 2,527,581 | Searer et al. | Oct. 31, 1950 |